US010979451B2

(12) United States Patent
Machlica et al.

(10) Patent No.: US 10,979,451 B2
(45) Date of Patent: Apr. 13, 2021

(54) AUTONOMOUS DOMAIN GENERATION ALGORITHM (DGA) DETECTOR

(71) Applicant: Cisco Technology, Inc., San Jose, CA (US)

(72) Inventors: Lukas Machlica, Prague (CZ); Ivan Nikolaev, Prague (CZ); Karel Bartos, Prague (CZ); Martin Grill, Prague (CZ)

(73) Assignee: Cisco Technology, Inc., San Jose, CA (US)

( * ) Notice: Subject to any disclaimer, the term of this patent is extended or adjusted under 35 U.S.C. 154(b) by 212 days.

(21) Appl. No.: 15/896,421

(22) Filed: Feb. 14, 2018

(65) Prior Publication Data

US 2019/0253435 A1    Aug. 15, 2019

(51) Int. Cl.
| | | |
|---|---|---|
| *G06F 21/55* | (2013.01) | |
| *G06F 21/56* | (2013.01) | |
| *H04L 29/06* | (2006.01) | |
| *H04L 29/12* | (2006.01) | |

(52) U.S. Cl.
CPC .......... *H04L 63/145* (2013.01); *G06F 21/552* (2013.01); *G06F 21/554* (2013.01); *G06F 21/56* (2013.01); *H04L 61/1511* (2013.01); *H04L 63/1408* (2013.01); *H04L 63/1425* (2013.01); *H04L 63/1441* (2013.01); *H04L 2463/144* (2013.01)

(58) Field of Classification Search
CPC ......... H04L 29/06; H04L 43/00; H04L 43/04; H04L 43/08; H04L 43/16; H04L 63/14; H04L 63/20; H04L 67/02; H04L 67/28; H04L 67/42; G06F 21/55; G06F 21/56
See application file for complete search history.

(56) References Cited

U.S. PATENT DOCUMENTS

| 9,602,525 B2 | 3/2017 | Qian et al. |
| 2013/0191915 A1 | 7/2013 | Antonakakis et al. |
| 2016/0057165 A1 | 2/2016 | Thakar et al. |

(Continued)

OTHER PUBLICATIONS

Xie et al., CMDHunter: "Finding Malicious Domains from Cyclical Communication" Dec. 11, 2016, 2016 5th International Conference on Computer Science and Network Technology (ICCSNT) (Year: 2016).*

(Continued)

*Primary Examiner* — Morshed Mehedi
*Assistant Examiner* — Kalish K Bell
(74) *Attorney, Agent, or Firm* — Behmke Innovation Group; James M. Behmke; Jonathon P. Western

(57) ABSTRACT

In one embodiment, a security device in a computer network detects potential domain generation algorithm (DGA) searching activity using a domain name service (DNS) model to detect abnormally high DNS requests made by a host attempting to locate a command and control (C&C) server in the computer network. The server device also detects potential DGA communications activity based on applying a hostname-based classifier for DGA domains associated with any server internet protocol (IP) address in a data stream from the host. The security device may then correlate the potential DGA searching activity with the potential DGA communications activity, and identifies DGA performing malware based on the correlating, accordingly.

20 Claims, 9 Drawing Sheets

(56) References Cited

U.S. PATENT DOCUMENTS

2017/0026390 A1* 1/2017 Sofka ............... H04L 63/1416
2017/0126706 A1   5/2017 Minea et al.
2017/0195352 A1* 7/2017 Yishay ............. H04L 63/1425
2018/0205753 A1* 7/2018 Raz ................. H04L 63/1425
2018/0316618 A1* 11/2018 Brown .............. H04L 47/80

OTHER PUBLICATIONS

Born et al., "Detecting DNS Tunnels Using Character Frequency Analysis" published on Apr. 25, 2010 at: "https://arxiv.org/abs/1004.4358" (retrieved on Apr. 28, 2020). See, e.g., pp. 1 and 11. (Year: 2010).*

Fadlullah et al., "DTRAB: Combating Against Attacks on Encrypted Protocols Through Traffic-Feature Analysis" published on Aug. 2010 by IEEE/ACM. See Transactions on Networking, vol. 18, No. 4 at pp. 1234-1247. (Year: 2010).*

* cited by examiner

AUTONOMOUS DOMAIN GENERATION ALGORITHM (DGA) DETECTOR

TECHNICAL FIELD

The present disclosure relates generally to computer networks, and, more particularly, to an autonomous domain generation algorithm (DGA) detector.

BACKGROUND

Detection of domain generation algorithms (DGAs, alternatively referring to domains generated automatically), has been well studied but is still an ongoing area in malware research. Commonly, DGA detectors incorporate different detection steps comprising statistical modeling of character distributions, white-listing of well-known domains, reuse of malware feeds, WHOIS registration dates for filtering of newly registered domains or requests to NXDOMAINs, and others. Every individual step is a potential source of false positives. For example, abbreviations or different languages are often source of false positives for statistical models based on character distributions. Therefore, external intelligence, not inherent in the network traffic, is required by most of these techniques in order to ensure sufficiently precise detections.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a security device in a computer network detects potential domain generation algorithm (DGA) searching activity using a domain name service (DNS) model to detect abnormally high DNS requests made by a host attempting to locate a command and control (C&C) server in the computer network. The server device also detects potential DGA communications activity based on applying a hostname-based classifier for DGA domains associated with any server internet protocol (IP) address in a data stream from the host. The security device may then correlate the potential DGA searching activity with the potential DGA communications activity, and identifies DGA performing malware based on the correlating, accordingly.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1:
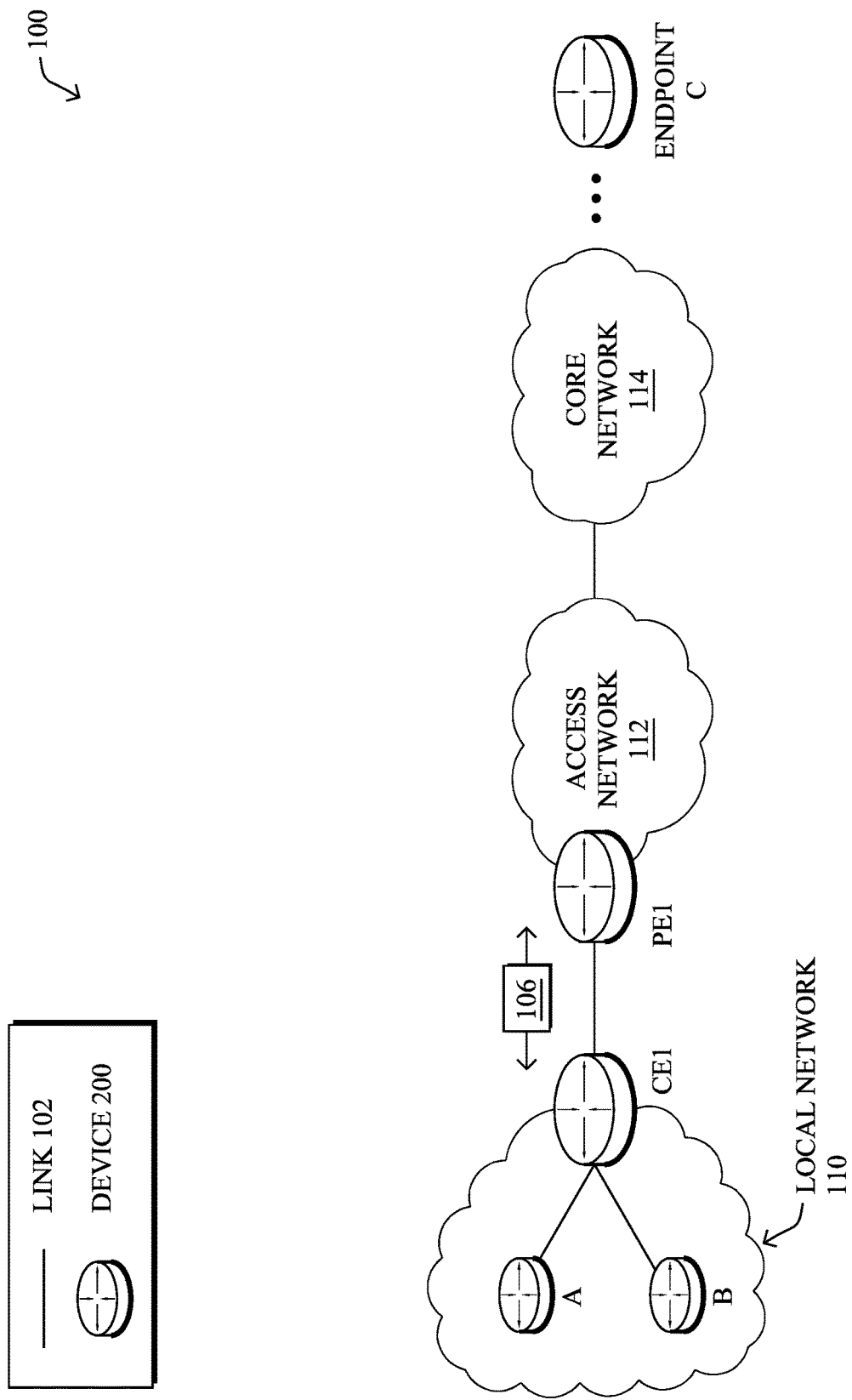
FIG. 1 illustrates an example computer network.

FIG. 1 is a schematic block diagram of an example communication network 100 illustratively comprising nodes/devices 200, such as a plurality of routers/devices interconnected by links and/or networks, as shown. For example, a customer edge (CE) router CE1 may interconnect nodes A and B on a local network 110 with a provider edge (PE) router PE1 of an access network 112. In turn, access network 112 may provide local network 110 with connectivity to a core network 114, such as the Internet.

The various nodes/devices 200 may exchange data packets 106 (e.g., traffic/messages) via communication network 100 over links 102 using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity. For example, node A in local network 110 may communicate with an endpoint node/device C (e.g., a remote server, etc.) via communication network 100.

As would be appreciated, links 102 may include any number of wired and/or wireless connections between devices. For example, node A may communicate wirelessly using a WiFi™ connection, CE1 and PE1 may communicate wirelessly using a cellular connection or via a hardwired connection (e.g., DSL, etc.), etc. In addition, while certain devices are depicted in FIG. 1, the view shown is a simplified view of communication network 100. In other words, communication network 100 may also include any number of intermediary networking devices such as, but not limited to, routers, switches, firewalls, etc., that are not shown.

In various embodiments, nodes/devices 200 may employ a secure communication mechanism, to encrypt and decrypt data packets 106. For example, nodes/devices 200 shown may use a Transport Layer Security (TLS) mechanism, such as the hypertext transfer protocol (HTTP) secure (HTTPS) protocol, to encrypt and decrypt data packets 106.

Figure 2:
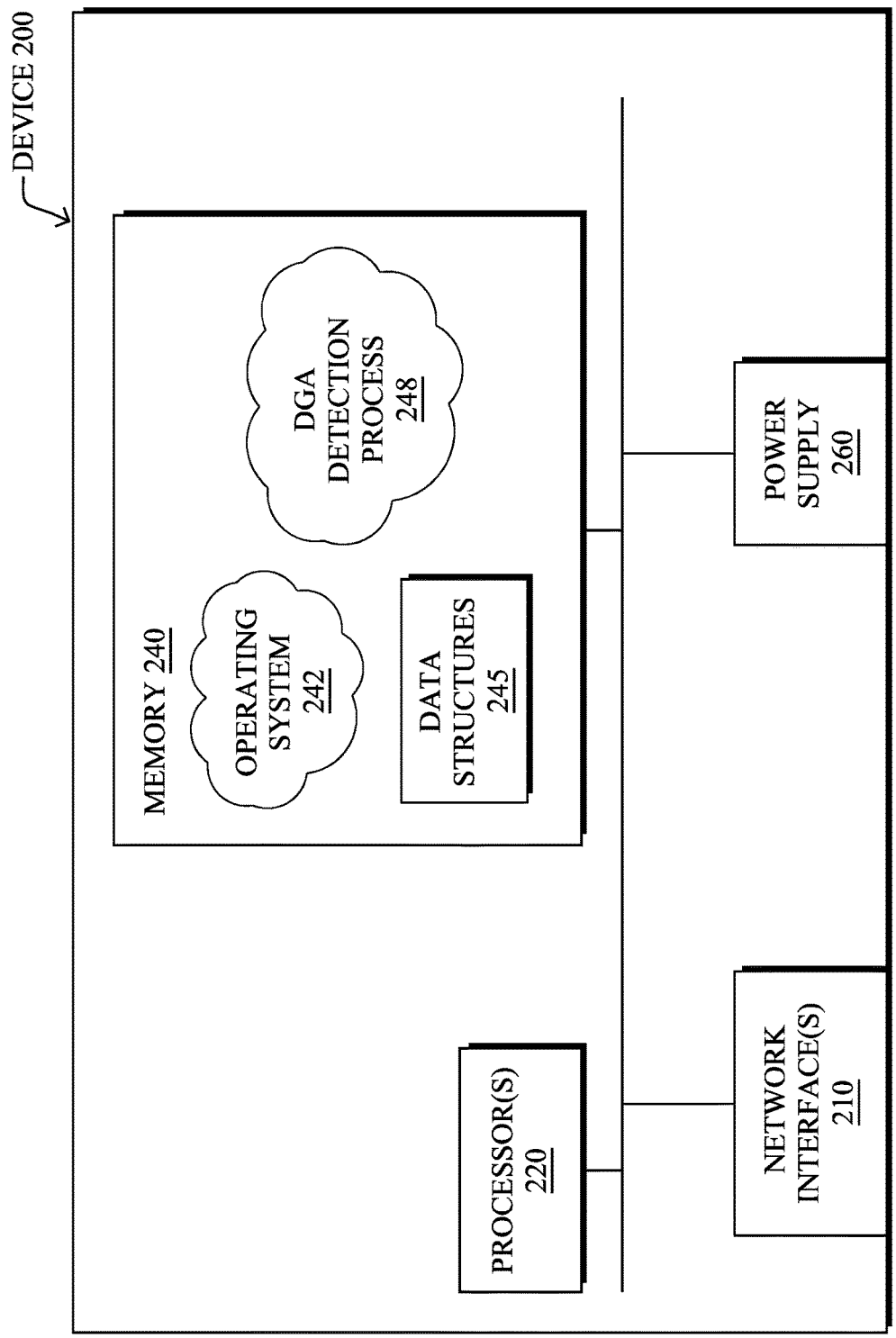
FIG. 2 illustrates an example network device/node.

FIG. 2 is a schematic block diagram of an example node/device 200 that may be used with one or more embodiments described herein, e.g., as any of the computing devices shown in FIG. 1, any other computing device that supports the operations of network 100 (e.g., switches, etc.), or any of the other devices referenced below. The device 200 may also be any other suitable type of device depending upon the type of network architecture in place. As shown, device 200 comprises one or more network interface(s) 210, one or more processor(s) 220, and a memory 240 interconnected by a system bus 250 and powered by a power supply 260.

The network interface(s) 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interface(s) 210 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor(s), functionally organizes the node by, among other things, invoking network operations in support of software processors and/or services executing on the device. These software processors and/or services may comprise a DGA detection process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

—Autonomous DGA Detection—

Malicious botnets are one of the most potent threats to networking systems. Once a client device has been infected with malware for the botnet, it may communicate with a command and control (C&C) server which sends control commands to the infected device. If the address of the C&C server is hardcoded into the malware itself, preventing operation of the botnet becomes a trivial task. Notably, all an administrator would need to do is block the address of the C&C server, to defeat control over the infected client device. However, many modern forms of malware do not use hardcoded addresses, but instead rely on domain generation algorithms (DGAs), to elude detection. Similar mechanisms are also used by other forms of malware, such as those that exfiltrate data from a network and the like.

In particular, to create malicious botnets, malware often utilizes a Domain Generation Algorithm (DGA) to generate domain names. For example, in the phase of establishing the botnet, the malware employs the DGA generated domain name to establish a network communication with a C&C server that is used by a botnet's originator (or "bot master") to control the botnet entities (bots) remotely. The use of the DGA makes it difficult to uncover the C&C server since the DGA can generate many domains, with only a (frequently changing) subset being registered and employed. Once a malicious botnet is established, the malicious botnet may deploy a platform for performing malicious activities such as denial-of-service (DoS) attacks, information gathering, distributed computing, cyber fraud, malware distribution, unsolicited marketing, etc.

In general, the DGA may be a simple algorithm that uses a seed, such as a current date and/or time to generate alphanumeric domain names. Alternatively, the DGA may be a complex algorithm that is sophisticated enough to generate English-language-like domain names with properly matched syllables or combinations of English dictionary words. A bot with DGA-based malware periodically attempts to communicate with the botmaster, and each attempt to communicate with the botmaster involves generating a plurality of domain names using a DGA and attempting to resolve each of the domain names until a domain name successfully resolves to the IP address of the C&C server for that malware. Prior to the bot communicating with the botmaster, the botmaster, using its own copy of DGA with the same seed as the DGA on the bot, generates a domain name and registers the domain name as the domain name for the C&C server, thus rendering techniques involving blacklisting of domain names ineffective.

To reduce the detectability of a C&C server, the botmaster tries to minimize the amount of time during which its C&C servers are exposed. The botmaster minimizes the exposure time by registering the domain names and making domain name system (DNS) server configurations only a few minutes prior to the time at which the DGA is configured to communicate with the C&C server. Once the time frame in which the DGA is configured to communicate with the botmaster passes, the C&C servers are shut down and removed immediately. Such minimization of exposure time renders ineffective any detection mechanisms that rely on a static domain name list. Additionally, DNS records associated with IP address of C&C server are deleted, therefore tracing of a DNS record to an IP address is also not feasible. Moreover, DGAs that can create English-language-like domains with properly matched syllables or use combinations of English dictionary words are almost always undetectable by means of a network domain's language analysis.

In a scenario where a bot is discovered, the bot has to be reverse engineered to uncover the DGA affecting the bot in order to block domain names generated by the DGA on the firewall or register the generated domain names before the botmaster registers them. Reverse engineering, however, is very time-consuming and requires an extremely advanced skill set. Additionally, the botmaster may configure the DGA to use a seed that is based on responses of popular websites such as google.com, baidu.com, answers.com or even trending topics on social networking websites such as Twitter or Facebook that are unknown in advance. Therefore, reverse engineering and employing a technique to filter domain names is also ineffective. Furthermore, the bot can generate so many domains, that registering or blocking all of the domain names is unfeasible.

As noted above, detection of domain generation algorithms (DGAs, alternatively referring to domains generated automatically), has been well studied but is still an ongoing area in malware research. Commonly, DGA detectors incorporate different detection steps comprising statistical modeling of character distributions, white-listing of well-known domains, reuse of malware feeds, WHOIS registration dates for filtering of newly registered domains or requests to NXDOMAINs, and others. Every individual step is a potential source of false positives. For example, abbreviations or different languages are often source of false positives for statistical models based on character distributions. Therefore, external intelligence, not inherent in the network traffic, is required by most of these techniques in order to ensure sufficiently precise detections.

The techniques herein, on the other hand, given the visibility on different levels of network traffic, overcome all of the aforementioned obstacles. In particular, the techniques herein introduce a fully data-driven detection architecture comprising netflows, unencrypted and even encrypted webflows utilizing encrypted traffic analysis (ETA), dynamically building passive DNS mapping, reusable data-driven detection blocks, and reinforcement learning loops. In certain embodiments, only information content directly observable in the network traffic need be used, without the need to monitor endpoints or query any external data source. Classification may also be performed on-line given a relatively short time window (e.g., 5 minutes) of network traffic.

Said differently, the techniques herein use correlation on top of various network telemetry data to detect DGA performing malware with high precision. As opposed to previous techniques, the proposed detection techniques herein cover both phases of DGA malware (DGA search and C&C communication), and does not rely on any external intelligence.

Specifically, according to one or more embodiments of the disclosure as described in detail below, a security device in a computer network detects potential DGA searching activity using a DNS model to detect abnormally high DNS requests made by a host attempting to locate a C&C server in the computer network. The server device also detects potential DGA communications activity based on applying a hostname-based classifier for DGA domains associated with any server IP address in a data stream from the host. The security device may then correlate the potential DGA searching activity with the potential DGA communications activity, and identifies DGA performing malware based on the correlating, accordingly (and notably, with a higher precision than would achievable by either DGA activity detection method individually).

Illustratively, the techniques described herein may be performed by hardware, software, and/or firmware, such as in accordance with the DGA detection process 248, which may include computer executable instructions executed by the processor 220 to perform functions relating to the techniques described herein, e.g., by a security device in conjunction with other corresponding devices and/or processes.

Operationally, the techniques herein are configured to work with different data sources including classic network flow information (e.g., "NetFlows"), encrypted traffic analysis (ETA) data and hypertext transfer protocol (HTTP) proxy logs. That is, where multiple data feeds are available for the same network, the solution herein is able to correlate these feeds to boost the detection accuracy.

DGA C&C consists of two phases—searching and communication. During the searching phase the DGA algorithm makes a lot of DNS requests, trying to locate the C&C server. Once it gets a successful reply, the server is located and the second phase begins—communication. During the second phase the server obtained during the first phase is contacted and C&C communication channel is established. Usually, these two phases are clearly separated in time.

Figure 3A:
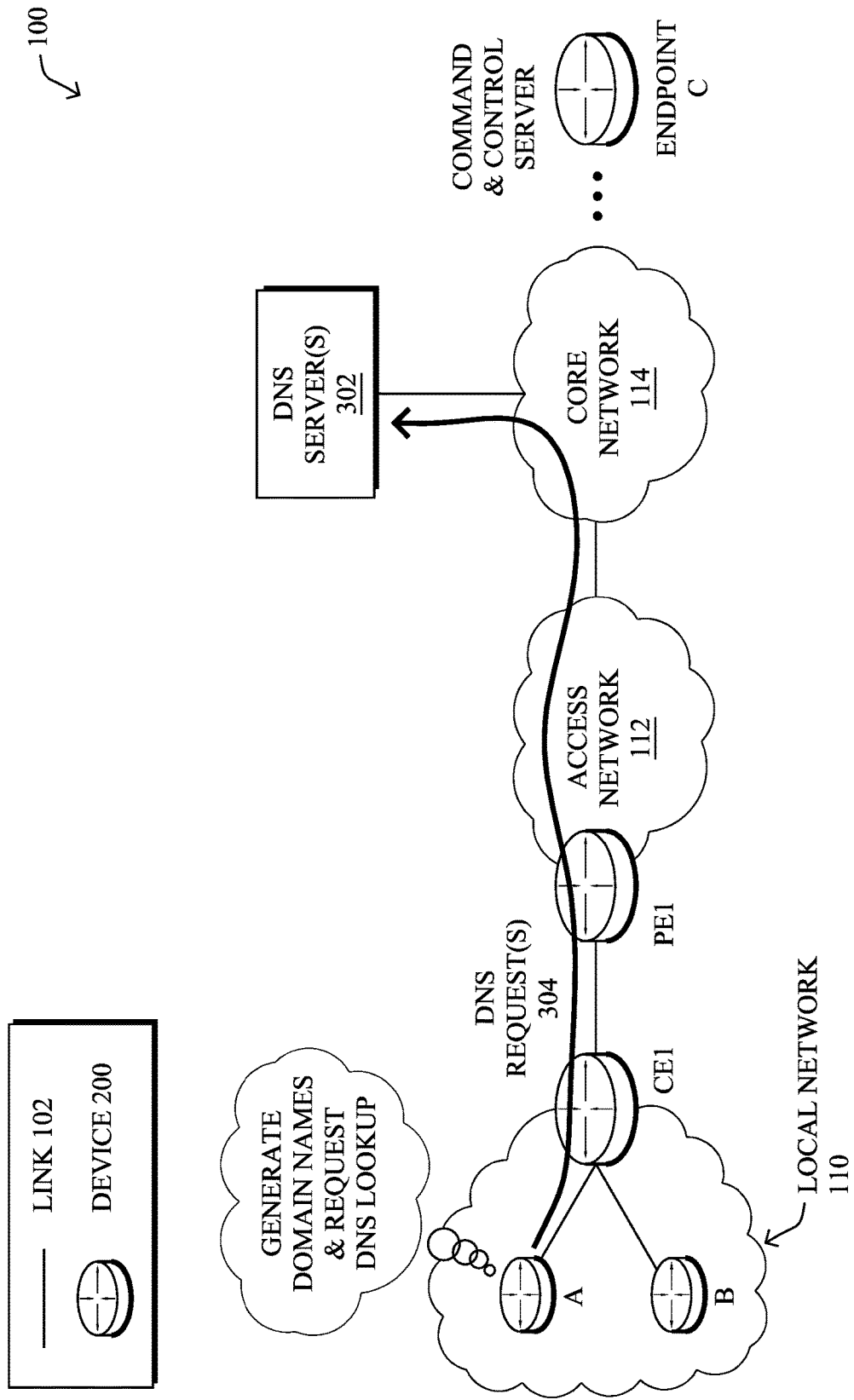
FIGS. 3A-3C illustrate an example of a typical domain generation algorithm (DGA) command and control (C&C) process.
Figure 3B:
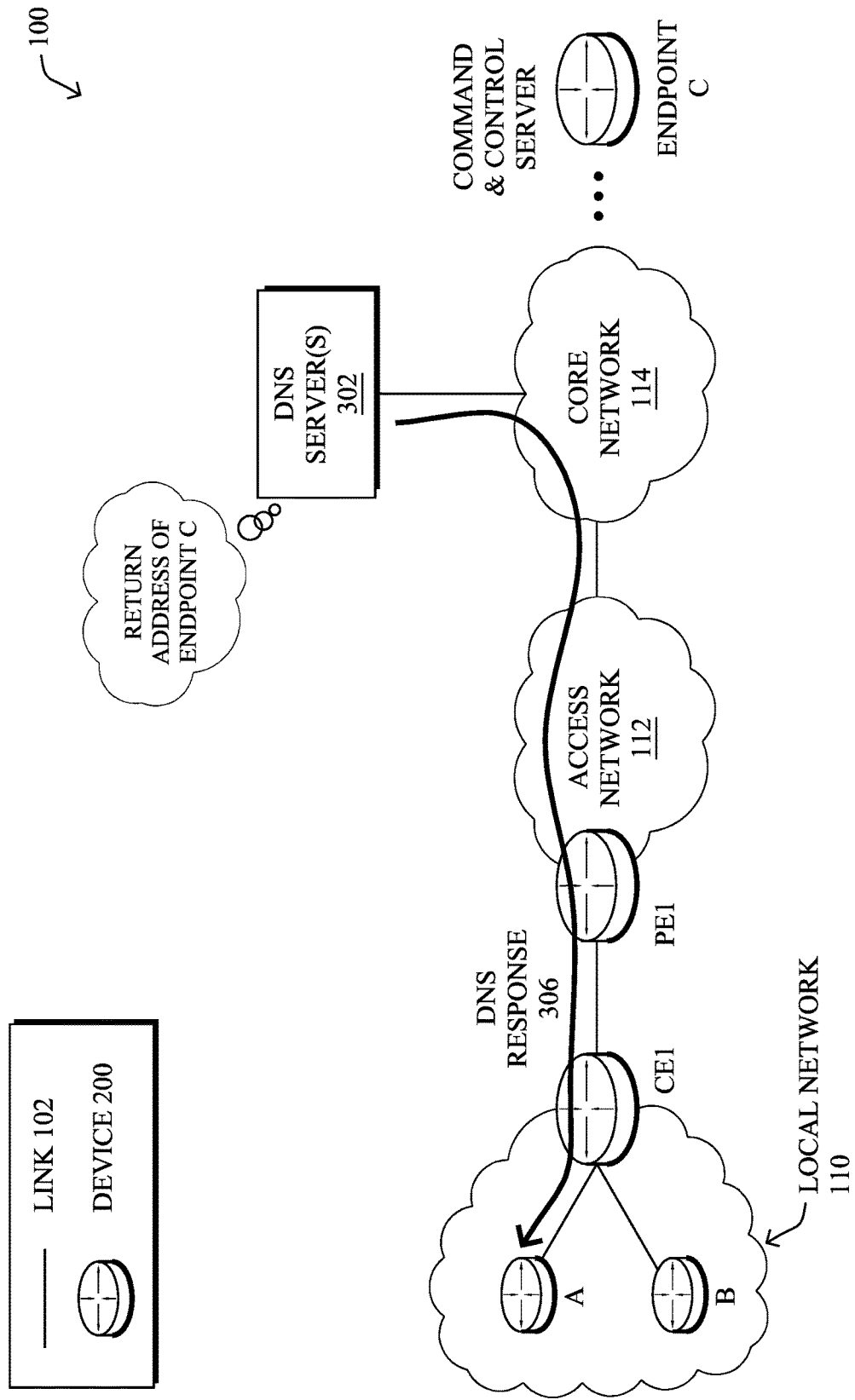
Figure 3C:
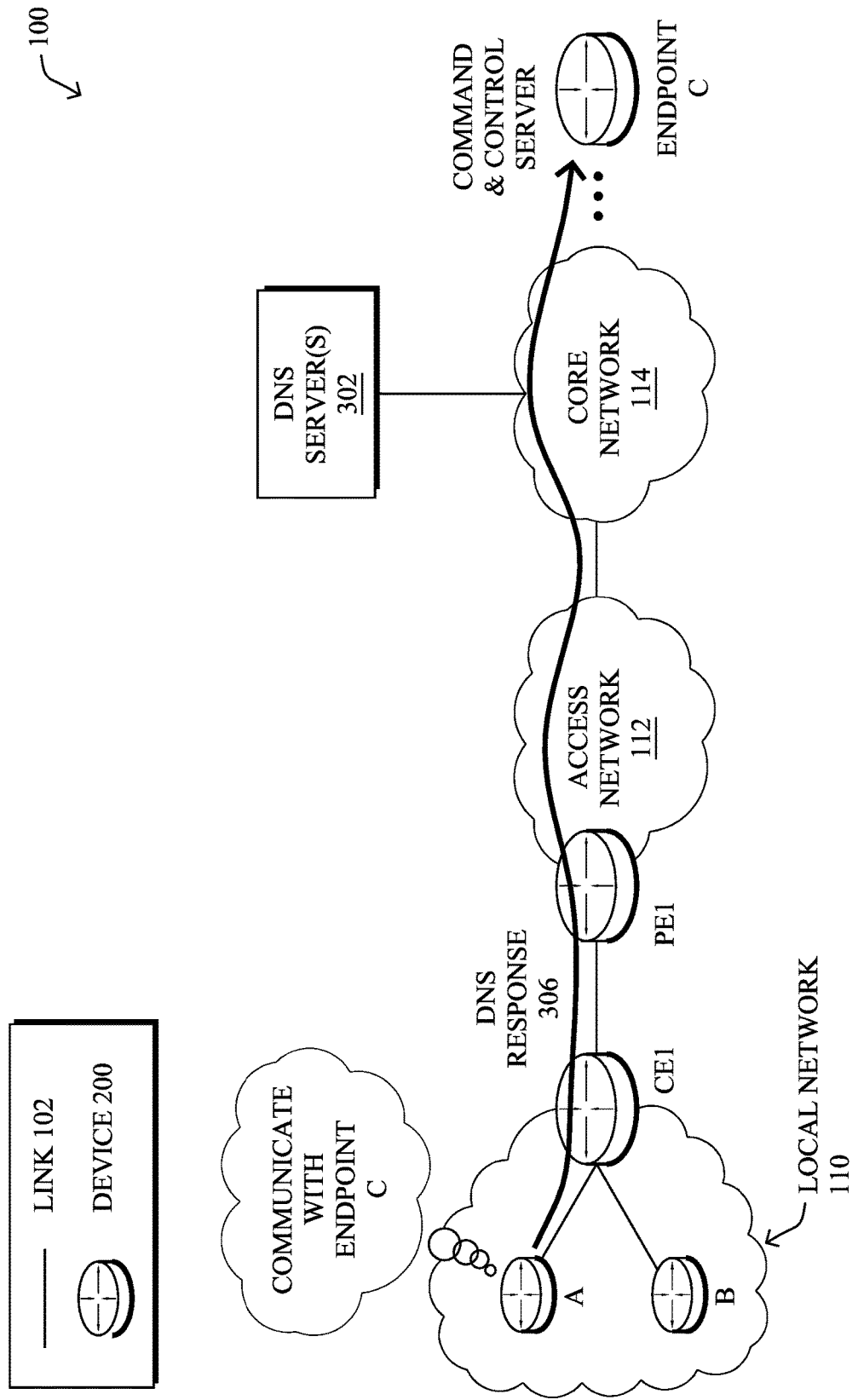

FIGS. 3A-3C illustrate an example of a typical DGA C&C process. As shown, assume that client device A has been infected with malware that uses a DGA to communicate with a corresponding C&C server, endpoint device C shown. During operation, both infected client device A and endpoint C may execute a DGA to generate a corresponding set of domain names. In turn, endpoint C or the entity associated therewith may register one or more of the generated domain names with a DNS service (e.g., to associate the IP address of endpoint C with a generated domain name). Infected client device A may then send one or more DNS requests 304 to a DNS service provided by DNS server(s) 302, to look up the IP address associated with one or more of the generated domain names. This allows the C&C server to constantly switch IP addresses to avoid blocking mechanism and still retain control over the infected client devices.

To further avoid detection, the number of domain names generated by a DGA during any given time, the number of domain names registered to the C&C server during any given time, and/or the number of domain names queried by an infected client device may be variable. For example, if the DGA generates 100,000 domain names per day, the C&C server registers only one domain name per day, and an infected client queries 1,000 domain names per day, this gives the client a 1% chance of making contact with the C&C server during any given day. As shown in FIG. 3B, assume that the address of server C is registered to one of the DGA-generated domain names included in DNS request(s) 304. In such a case, DNS server 302 may include the address of server C in a DNS response 306 sent back to infected client device A. With this address, client device A is now able to make direct contact with the C&C server, endpoint C, to receive further commands for its installed malware, as shown in FIG. 3C.

Figure 4:
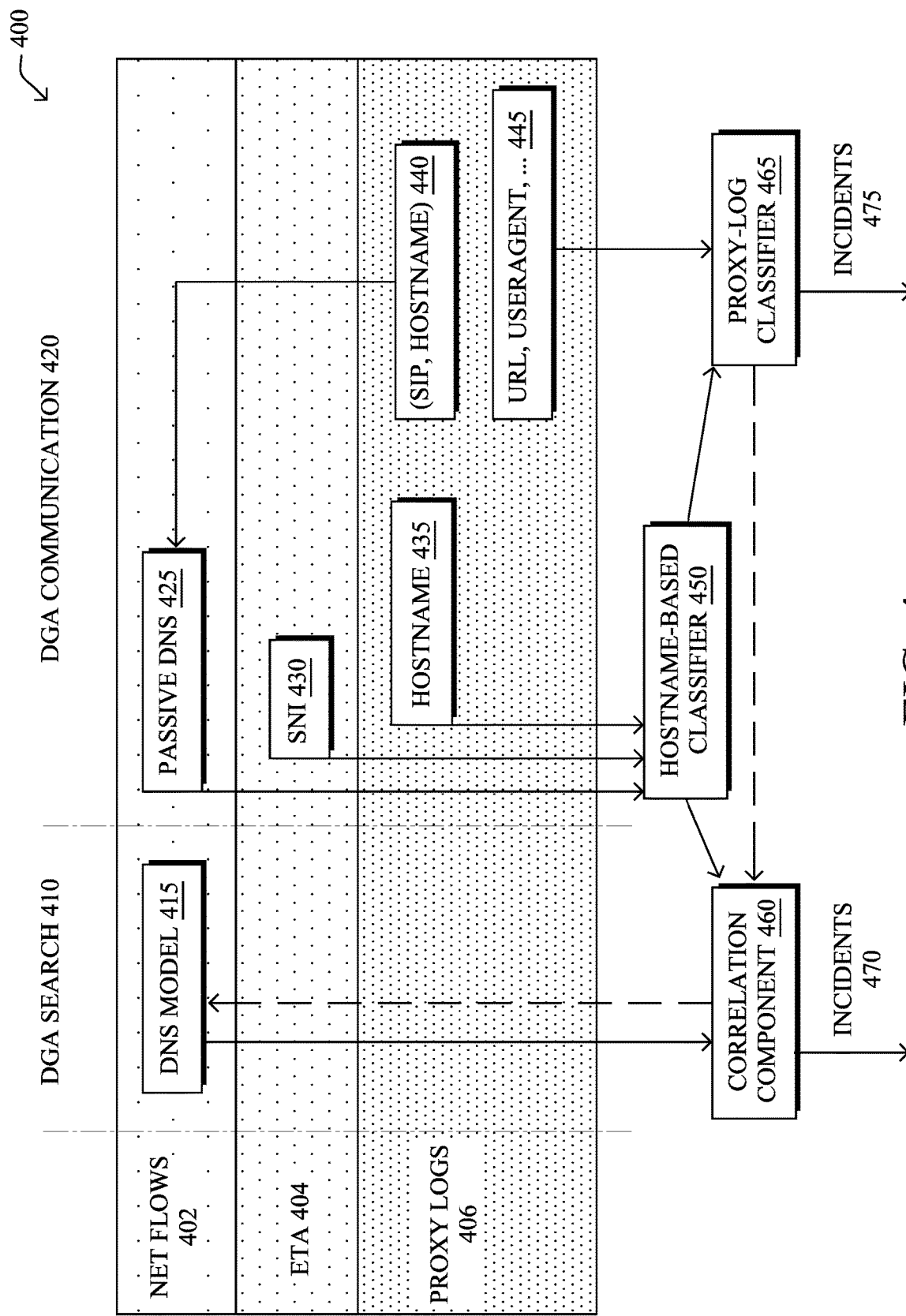
FIG. 4 illustrates an example of an autonomous DGA detection system configuration.

According to the techniques herein, and with reference generally to the configuration 400 of FIG. 4, two (or more) detection components that are individually focused at separate phases of DGA infection (e.g., DGA search and DGA communication) can be correlated for increased accuracy in malware incident detection. In particular, the correlation component of the techniques herein combines the output of the two detection components, and is able to detect all phases of the DGA infection, with greater incident precision than would achievable by either DGA activity detection method individually, as noted above. Furthermore, by covering the entire timeline of the DGA C&C process, the techniques herein can add further explainable detail to the incident cycle.

The first detection component is aimed at the searching phase of C&C ("DGA search" 410). This portion illustratively uses a DNS model 410 to detect an abnormally high amount of DNS requests made by a host based on network flow ("netflow") data 402, and optionally on ETA data 404. For example, in one embodiment, a number of domain name server requests originating from a particular network node are determined, where the domain name server requests are directed to one or more domain name servers. A number of internet protocol (IP) addresses contacted by the particular network node are determined, and based on the number of domain name server requests and the number of IP addresses contacted, the potential existence of malware on the particular network node can be identified.

The second detection component herein detects the DGA communication phase 420. This portion is primarily based on the information about the hostname, and can digest different data sources such as NetFlows 402 in combination with passive DNS 425 or ETA data 406, using server name indication (SNI) fields 430 in HTTPS. The techniques herein can also work on regular HTTP proxy logs 406, where it makes use of other fields such as hostnames 435/440 (session initiation protocol, hostname, etc.), uniform resource locators and UserAgents 445, etc. For example, in one embodiment, DGA communication activity detection may involve obtaining a plurality of sample domain names, where each of the plurality of domain names is labeled as a DGA domain, a non-DGA domain, or a suspicious domain. A classifier may then be trained in a first stage based on the plurality of sample domain names. A plurality of sample proxy logs including proxy logs of DGA domains and proxy logs of non-DGA domains are also obtained to train the classifier in a second stage based on the plurality of sample domain names and the plurality of sample proxy logs. Next, a plurality of live traffic proxy logs may be obtained and the classifier is then tested by classifying the plurality of live traffic proxy logs as DGA proxy logs. The classifier may then be used to identify network communication as malware network communication with DGA domains based on the trained and tested classifier and the classifier. In one specific embodiment, the classifier is forwarded to a second computing device to identify network communication of a third computing device as malware network communication with DGA domains via a network interface unit of the third computing device based on the trained and tested classifier.

Note that the passive DNS 425 used for the NetFlow detection in the DGA communication detection component can be built on-the-fly by using proxy logs or ETA data, without making queries to any external databases. (Note also that the fully data-driven DGA communication detector based on proxy logs requires the full content of a proxy log to be available, and thus fails for encrypted traffic.)

According to the techniques herein, a security device can detect DGA malware using both of the above defined phases which increases the precision of the resulting alarms. More than that, the techniques herein interconnect and leverage different traffic sources, detection modules and reinforcement loops yielding a timeline of the DGA C&C channel comprising both infection phases. In particular, the primary strength of the specific techniques herein is the correlation component 460 which is able to combine the outputs of the two detection components above, as well as correlate information across different data sources. That is, the correlation component 460 takes the verdicts from the different modules, i.e., the DGA search portion 410 (e.g., DNS model 415) and the DGA communication portion 420 (e.g., hostname-based classifier 450 and optionally proxy-log classifier 465), and correlates them to better (more precisely and confidently) identify DGA performing malware (incidents 470). For example, assume that the DNS model 415 detects an alert condition, but it is not (or cannot be) confirmed as malware until the DGA communication 420 parameters (namely hostname-based classifier 450, and for even greater correlation and confidence, proxy-log classifier 465) also provide their corroborating verdicts, such as where a proxy can assign hostnames for an IP address, so the techniques herein can correlate this information to determine whether any DGA appeared on these IP addresses, accordingly.

Note that the techniques herein are able to work with NetFlow data 402 alone. While the DNS model 415 points out potential hosts with infection, the hostname based classifier 450 searches for any DGA domain associated with a sever IP observed in the netflow datastream by using Passive DNS map 425. Highlighting DNS requests together with DGA C&C servers and associated domains not only increases efficacy, but also gives valuable information to the analyst, because the analyst is shown the DGA domain search as well as the malware C&C established afterwards (e.g., correlating IP addresses to host names through the visibility of the proxy logs). This will give the analyst valuable information and will boost the analyst's confidence in the system. (Confidence may be further reinforced once additional detection is triggered by the proxy-log classifier 465 (incidents 475).) For instance, the techniques herein are also able to create a timeline of the DGA C&C channel and show both of its phases, providing greater explanation of the DGA C&C process from end to end. The techniques herein thus not only detect malicious behavior, but can be used to convince an analyst or administrator that the behavior really is malicious.

The correlation component may also be used to exchange information between the two detection components to improve their individual accuracy. For example, it can be used to reinforce decisions made by the DNS model. For instance, the individual DGA activity detection methods above, when used by themselves, have to have a tight threshold in order to suppress false positives and increase precision. However, tight thresholds lower the recall of any detection system. For example, for DGA search activity detection, a source of false positives can be any application performing a high amount of DNS requests, for example for software testing purposes. On the other hand, for DGA communication activity detection, full proxy logs for non-encrypted traffic have to be available to perform the detection. The hostname detection module alone would produce too many false positives related to usage of abbreviations or DGA-like words that occur in some foreign languages. The correlation component herein, therefore, takes input verdicts from all of the detection modules (e.g., DNS model, hostname-based classifier, and optionally the additional proxy log classifier) and combines them. The techniques herein are able to adjust the detection thresholds of the individual DGA activity detection methods based on verdicts from the individual detectors. For example, the system may begin with tight thresholds, and after a period of time, decision statistics from individual modules are collected, correlated, and combined to adjust the detection thresholds, accordingly. The adjusted thresholds can then maximize both precision and recall using all of the available information.

Figure 5:
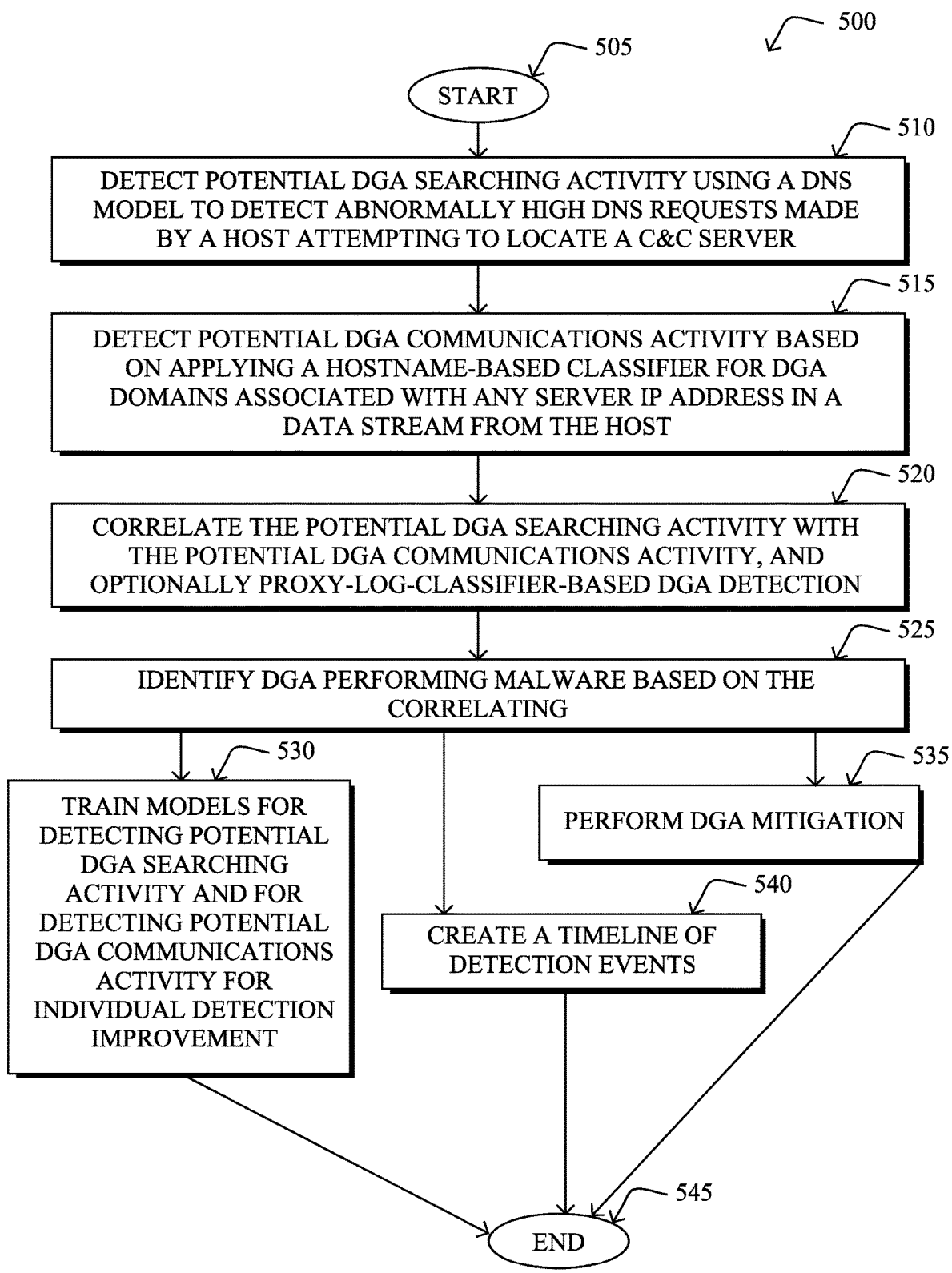
FIG. 5 illustrates an example simplified procedure for autonomous DGA detection.

FIG. 5 illustrates an example simplified procedure for autonomous DGA detection in a computer network in accordance with one or more embodiments described herein. For example, a non-generic, specifically configured device (e.g., a security device 200 or other device configured to implement the system 400) may perform procedure 500 by executing stored instructions (e.g., process 248). The procedure 500 may start at step 505, and continues to step 510, where, as described in greater detail above, a security device detects potential DGA searching activity using a DNS model 415 to detect abnormally high DNS requests made by a host attempting to locate a C&C server in the computer network (e.g., based on one or both of network flow data 402 and ETA data 404). In step 515, the security device also detects potential DGA communications activity based on applying a hostname-based classifier 450 for DGA domains associated with any server IP address in a data stream from the host. For example, as described above, detecting potential DGA communications activity may be based on one or more of network flow data 402, ETA data 404, DNS data (e.g., Passive DNS 425), SNI fields 430 in HTTP messages, HTTP proxy logs 406, hostnames 435/440, URLs and user agent information in HTTP messages (445), and so on.

In step 520, the security device may then correlate the potential DGA searching activity with the potential DGA communications activity (correlation component 460), along with optionally also correlating proxy-log-classifier-based DGA detection (proxy-log classifier 465). Accordingly, in step 525, the security device can identify DGA performing malware (incidents 470) based on the correlating.

Note that in additional embodiments, procedure 500 may include one or more of steps 530-540. Namely, in step 530, the procedure may further train a first model for detecting potential DGA searching activity and a second model for detecting potential DGA communications activity for individual detection improvement based on the correlating and identifying (e.g., adjusting false positive thresholds of one or both of the first model and second model, as described above). Further, in step 530, the procedure may perform one or more DGA mitigation actions in response to identifying DGA performing malware (e.g., blocking traffic related to the malware and/or alerting an administrator to the malware). Lastly, in step 540, the procedure may also include creating a timeline of detection events based on the potential DGA searching activity and the potential DGA communications activity, as noted above.

The procedure 500 may then end in step 545, notably with the ability to continue detecting potential DGA activities as described above.

Figure 6:
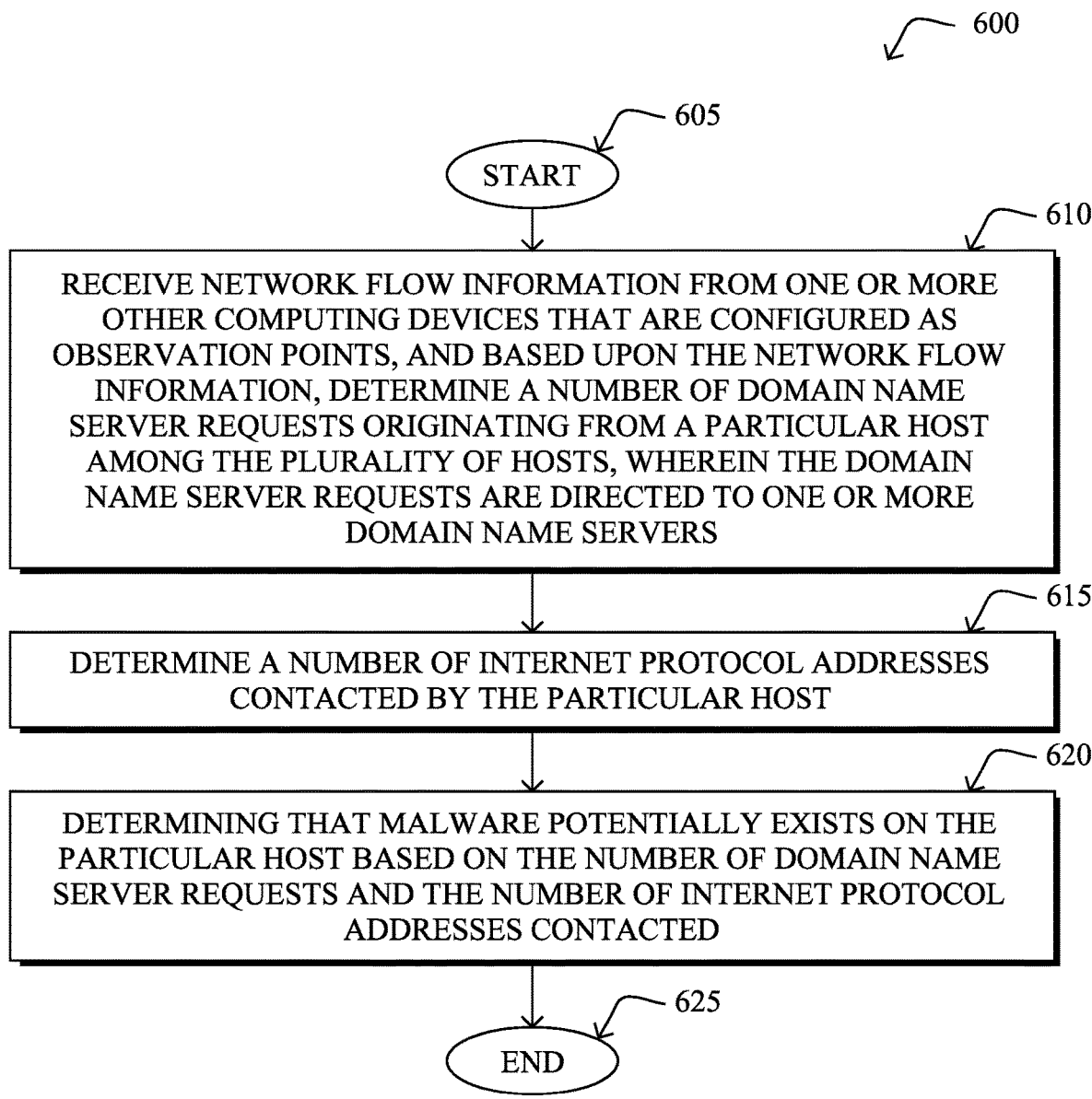
FIG. 6 illustrates an example simplified procedure for detecting potential DGA searching activity.

In addition, FIG. 6 illustrates an example simplified procedure for detecting potential DGA searching activity in accordance with one or more embodiments described herein (e.g., an example embodiment for step 510 of FIG. 5 above). The procedure 600 may start at step 605, and continues to step 610, where, as described in greater detail above, network flow information is received from one or more other computing devices that are configured as observation points, and based upon the network flow information, a number of domain name server requests originating from a particular host among the plurality of hosts can be determined, wherein the domain name server requests are directed to one or more domain name servers. In step 615, a number of internet protocol addresses contacted by the particular host can be determined, and then in step 620 it can be determined that malware potentially exists on the particular host based on the number of domain name server requests and the number of internet protocol addresses contacted. The simplified procedure 600 may then end in step 625.

Figure 7:
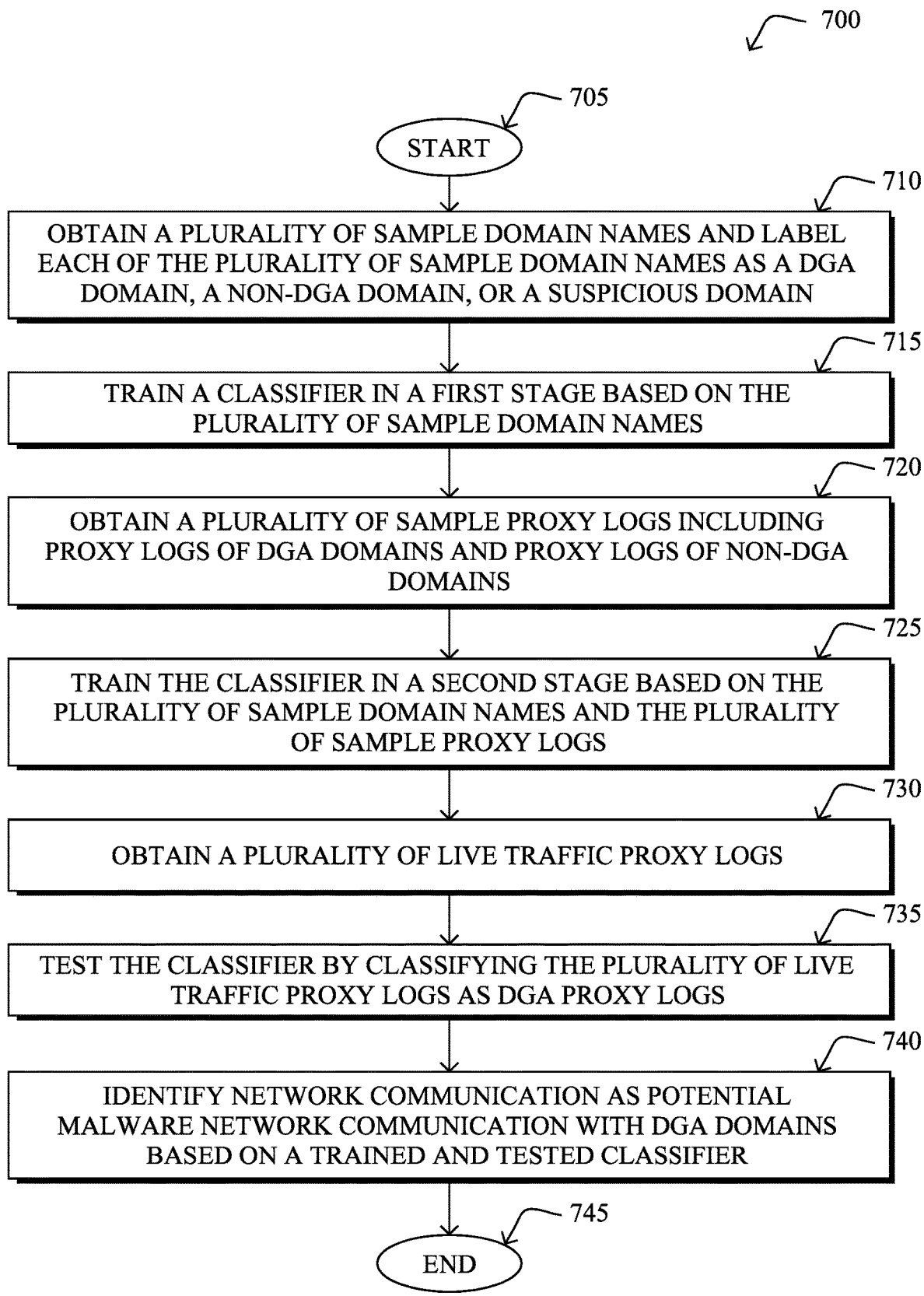
FIG. 7 illustrates an example simplified procedure for detecting potential DGA communications activity.

Moreover, FIG. 7 illustrates an example simplified procedure for detecting potential DGA communications activity in accordance with one or more embodiments described herein (e.g., an example embodiment for step 515 of FIG. 5 above). The procedure 700 may start at step 705, and continues to step 710, where, as described in greater detail above, a plurality of sample domain names are obtained and labelled as a DGA domain, a non-DGA domain, or a suspicious domain, then in step 715, a classifier is trained in a first stage based on the plurality of sample domain names. In step 720, a plurality of sample proxy logs are obtained, including proxy logs of DGA domains and proxy logs of non-DGA domains, and then in step 725 the classifier is trained in a second stage based on the plurality of sample domain names and the plurality of sample proxy logs. Once obtaining a plurality of live traffic proxy logs in step 730, then in step 735 the classifier is tested by classifying the plurality of live traffic proxy logs as DGA proxy logs, and then in step 740 network communication can be identified as potential malware network communication with DGA domains based on a trained and tested classifier. The simplified procedure 700 may then end in step 745.

It should be noted that while certain steps within procedures 500-700 may be optional as described above, the steps shown in FIGS. 5-7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 500-700 are described separately, certain steps from each procedure may be incorporated into each other procedure, and the procedures are not meant to be mutually exclusive.

The techniques described herein, therefore, provide for autonomous DGA detection. In particular, the techniques herein result in comprehensive DGA detection able to operate on variety of data sources, correlating detection of both DGA C&C phases: searching and communication. Notably, as described above, embodiments of the autonomous DGA detector are able to work without any external feeds, while still boosting efficacy based on combined knowledge. The techniques herein also provide increased visibility into the threat incident, beneficial for cause analysis, confirmation, and other reporting and/or mitigation techniques.

Additionally, the present disclosure is directed to issues related to limited recall of individual detection methods, and possible sources of their false positives. That is, the techniques herein address these problems, extending current DGA detection techniques to handle different types of input data, and correlating the verdicts from individual detectors to reinforce individual classification modules. This therefore significantly increases efficacy and user visibility into the incident.

While there have been shown and described illustrative embodiments that provide for autonomous DGA detection, it is to be understood that various other adaptations and modifications may be made within the spirit and scope of the embodiments herein. For example, while certain embodiments are described herein with respect to using certain techniques for the search and communication phase detections, the correlated techniques are not limited as such and may be used with other techniques for detecting DGA activity on the search (e.g., DNS) and communication (e.g., proxy log) stages, according, in other embodiments. In addition, while certain protocols are shown, such as HTTP, HTTPS, DNS, etc., other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:
1. A method, comprising:
    detecting, by a security device in a computer network, potential domain generation algorithm (DGA) searching activity using a domain name service (DNS) model to detect DNS requests made by a host attempting to locate a command and control (C&C) server in the computer network based on at least encryption traffic analysis (ETA) data;

detecting, by the security device, potential DGA communications activity by applying a hostname-based classifier for DGA domains associated with any server internet protocol (IP) address in a data stream from the host and building a passive DNS map on the fly using the ETA data;

correlating, by the security device, the potential DGA searching activity with the potential DGA communications activity by combining an output of the DNS model with an output of the hostname-based classifier and the passive DNS map built using the ETA data, wherein the output of the DNS model is indicative of a number of DNS requests from a particular network node to one or more domain name servers, and wherein the output of the hostname-based classifier is indicative of whether any network communication comprises a malware network communication with one or more DGA domains; and identifying, by the security device, DGA performing malware based on the correlation of the potential DGA searching activity with the potential DGA communications activity.

2. The method as in claim 1, further comprising:
training a first model for the detecting potential DGA searching activity and a second model for the detecting potential DGA communications activity for individual detection improvement based on the correlating and the identifying.

3. The method as in claim 2, wherein the training comprises:
adjusting false positive thresholds of one or both of the first model and a second model.

4. The method as in claim 1, further comprising:
refining the identifying by further correlating with proxy-log-classifier-based DGA detection.

5. The method as in claim 1, further comprising:
performing DGA mitigation in response to identifying DGA performing malware.

6. The method as in claim 5, wherein the DGA mitigation comprises blocking traffic related to the malware.

7. The method as in claim 5, wherein the DGA mitigation comprises alerting an administrator to the malware.

8. The method as in claim 1, further comprising:
creating a timeline of detection events based on the potential DGA searching activity and the potential DGA communications activity.

9. The method as in claim 1, wherein the detecting the potential DGA searching activity is based on network flow data.

10. The method as in claim 1, wherein the detecting potential DGA communications activity is based on one or more of network flow data, encrypted traffic analysis (ETA) data, DNS data, server name indication (SNI) field in hypertext transfer protocol (HTTP) messages, HTTP proxy logs, hostnames, uniform resource locators (URLs), and user agent information in HTTP messages.

11. The method as in claim 1, wherein the detecting potential DGA communications activity uses passive DNS mapping without querying external databases.

12. The method as in claim 11, wherein passive DNS mapping is based on building passive DNS maps on-the-fly using one or both of proxy logs and the ETA data.

13. The method as in claim 1, wherein the detecting potential DGA searching activity comprises:

receiving network flow information from one or more other computing devices that are configured as observation points, and based upon the network flow information, determining a number of domain name server requests originating from a particular host among a plurality of hosts, wherein the domain name server requests are directed to one or more domain name servers;

determining a number of internet protocol addresses contacted by the particular host; and determining that malware potentially exists on the particular host based on the number of domain name server requests and the number of internet protocol addresses contacted.

14. The method as in claim 1, wherein the detecting potential DGA communications activity comprises:
obtaining a plurality of sample domain names and labeling each of the plurality of sample domain names as a DGA domain, a non-DGA domain, or a suspicious domain;
training a classifier in a first stage based on the plurality of sample domain names;
obtaining a plurality of sample proxy logs including proxy logs of the DGA domains and proxy logs of non-DGA domains;
training the classifier in a second stage based on the plurality of sample domain names and the plurality of sample proxy logs;
obtaining a plurality of live traffic proxy logs;
testing the classifier by classifying the plurality of live traffic proxy logs as DGA proxy logs; and
identifying network communication as potential malware network communication with the DGA domains based on a trained and tested classifier.

15. An apparatus, comprising:
one or more network interfaces to communicate with a computer network;
a processor coupled to the network interfaces and configured to execute one or more process; and
a memory configured to store a process executable by the processor, the process when executed configured to:
detect potential domain generation algorithm (DGA) searching activity using a domain name service (DNS) model to detect DNS requests made by a host attempting to locate a command and control (C&C) server in the computer network based on at least encryption traffic analysis (ETA) data;
detect potential DGA communications activity by applying a hostname-based classifier for DGA domains associated with any server internet protocol (IP) address in a data stream from the host and building a passive DNS map on the fly using the ETA data;
correlate the potential DGA searching activity with the potential DGA communications activity by combining an output of the DNS model with an output of the hostname-based classifier and the passive DNS map built using the ETA data, wherein the output of the DNS model is indicative of a number of DNS requests from a particular network node to one or more domain name servers, and wherein the output of the hostname-based classifier is indicative of whether any network communication comprises a malware network communication with one or more PGA domains; and
identify DGA performing malware based on the correlation of the potential DGA searching activity with the potential DGA communications activity.

16. The apparatus as in claim 15, wherein the process, when executed, is further configured to:
    train a first model for the detecting potential DGA searching activity and a second model for the detecting potential DGA communications activity for individual detection improvement based on the correlating and the identifying.

17. The apparatus as in claim 15, wherein the process, when executed, is further configured to:
    refine the identifying by further correlating with proxy-log-classifier-based DGA detection.

18. The apparatus as in claim 15, wherein the process, when executed, is further configured to:
    perform DGA mitigation in response to identifying DGA performing malware.

19. A tangible, non-transitory, computer-readable medium storing program instructions that cause a computer to execute a process, comprising:
    detecting potential domain generation algorithm (DGA) searching activity using a domain name service (DNS) model to detect DNS requests made by a host attempting to locate a command and control (C&C) server in a computer network based on at least encryption traffic analysis (ETA) data;
    detecting potential DGA communications activity by applying a hostname-based classifier for DGA domains associated with any server internet protocol (IP) address in a data stream from the host and building a passive DNS map on the fly using the ETA data;
    correlating the potential DGA searching activity with the potential DGA communications activity, by combining an output of the DNS model with an output of the hostname-based classifier and the passive DNS map built using the ETA data, wherein the output of the DNS model is indicative of a number of DNS requests from a particular network node to one or more domain name servers, and wherein the output of the hostname-based classifier is indicative of whether any network communication comprises a malware network communication with one or more DGA domains; and
    identifying DGA performing malware based on the correlation of the potential DGA searching activity with the potential DGA communications activity.

20. The computer-readable medium as in claim 19, wherein the process further comprises:
    training a first model for the detecting potential DGA searching activity and a second model for the detecting potential DGA communications activity for individual detection improvement based on the correlating and the identifying.

* * * * *

UNITED STATES PATENT AND TRADEMARK OFFICE
CERTIFICATE OF CORRECTION

PATENT NO. : 10,979,451 B2
APPLICATION NO. : 15/896421
DATED : April 13, 2021
INVENTOR(S) : Lukas Machlica et al.

It is certified that error appears in the above-identified patent and that said Letters Patent is hereby corrected as shown below:

In the Claims

Column 12, Line 64, please amend as shown:
with one or more DGA domains; and

Signed and Sealed this
Eighth Day of June, 2021

Drew Hirshfeld
*Performing the Functions and Duties of the
Under Secretary of Commerce for Intellectual Property and
Director of the United States Patent and Trademark Office*